United States Patent [19]

Warner

[11] Patent Number: 4,788,744

[45] Date of Patent: Dec. 6, 1988

[54] STOP IN PARTICULAR FOR THE SLIDE BLOCK IN A GUIDE TRACK

[75] Inventor: Hermann Warner, Trebur, Fed. Rep. of Germany

[73] Assignee: General Motors Corporation, Detroit, Mich.

[21] Appl. No.: 138,579

[22] Filed: Dec. 28, 1987

[30] Foreign Application Priority Data

Mar. 17, 1987 [DE] Fed. Rep. of Germany ....... 3708575

[51] Int. Cl.⁴ .............................................. E05F 5/08
[52] U.S. Cl. .......................................... 16/85; 49/407
[58] Field of Search ............... 16/82, 85, 86 R, 86 A, 16/86 B, 86 C, DIG. 6; 49/407; 292/DIG. 73

[56] References Cited

U.S. PATENT DOCUMENTS 1,604,627 10/1926 Bacher et al. .......... 292/DIG. 73 X
2,539,064 1/1951 Ernest ..................... 292/DIG. 73 X

FOREIGN PATENT DOCUMENTS 3503547 5/1986 Fed. Rep. of Germany .......... 16/82

Primary Examiner—Fred A. Silverberg
Attorney, Agent, or Firm—William A. Schuetz

[57] ABSTRACT

A stop is disclosed which can be mounted without a great work effort, permits setting in any position and simple adjustment, and whose firm seating is guaranteed. The stop is displaceable in a guide rail having a C-shaped cross section and is preferably served to limit the travel of a sliding piece connected to the window pane of a motor vehicle. It is designed as a spring clip, it can be pushed into the rail having a C-shaped cross section, it can be displaced and fixed in same, and it absorbs a high impact force. The spring clip is bent in a wave-shaped pattern and has claws for fixation inside the said rail having a C-shaped cross section.

5 Claims, 1 Drawing Sheet

STOP IN PARTICULAR FOR THE SLIDE BLOCK IN A GUIDE TRACK

The present invention pertains to a stop, especially for a sliding piece which is movable in a guide rail having a C-shaped cross section and is connected to the window plane of a motor vehicle.

A sliding place for guiding window panes, especially of motor vehicles, which is arranged in a guide rail, is disclosed in DE-PS No. 35 03 547. The said sliding piece is pushed into the said rail having a C-shaped cross section through a recess provided at the top end of the guide rail. A stop fixed by screws in the said rail having a C-shaped cross section prevents the undesirable exit of the said sliding piece located in the said rail having a C-shaped cross section into the said recess at the top end of the said guide rail. The prior-art stop requires cumbersome mounting, because it must be fixed with screws. No provision is made for continuous adjustment of the said stop.

The task of the present invention is therefore to create a stop which can be mounted without great work effort, permits setting in any desired position, and simple adjustment, and in which firm seating is guaranteed. This is achieved according to the present invention in an advantageous manner in that the said stop is designed as a spring clip, it can be pushed into the said rail having a C-shaped cross section, it can be displaced and fixed in the said rail, and it absorbs a high impact force.

According to an advantageous further improvement of the present invention, the said spring clip is bent in a wave-shaped pattern and is symmetrical. The spring clip has claws with which it can be fixed inside the said rail having a C-shaped cross section. Furthermore, the said spring clip may also have two legs reaching out of the said rail having a C-shaped cross section, which said legs bring about the release of the said claws on compression to permit displacement of the spring clip in the longitudinal direction of the said rail having a C-shaped cross section. The tongue-like claws can be formed by incisions made in the spring plate and by bending over. The said claws may be arranged in openings of the said spring clip and at the two legs of the said spring clip The said spring clip can be inserted into and released in the said rail having a C-shaped cross section by means of round-nosed pliers bent at right angles with which the said legs reaching out can be pressed together. The said legs of the said spring clip may also be flat instead of being curved and may be provided with holes for bent round-nosed pliers.

The said stop according to the present invention can be manufactured simply and inexpensively as a stamping part, so that economical mass production is possible. It is also characterized by easy and rapid mounting in the corresponding rail having a C-shaped cross section, and it can easily be released from its locked position and adjusted by means of the said two legs reaching out of the said rail.

The present invention further resides in various novel constructions and arrangement of parts, and further objects, novel characteristics and advantages of the present invention will be apparent to those skilled in the art to which it relates and from the following detailed description of the illustrated, preferred embodiment(s) thereof made with reference to the accompanying drawings forming a part of this specification and in which similar reference numerals are employed to designate corresponding parts throughout the several views, and in which.

Figure 2:
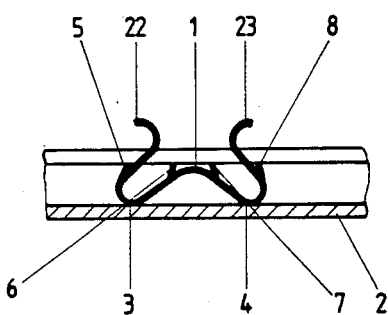
FIG. 2 shows a longitudinal section through the spring clip and the rail having a C-shaped cross section.
Figure 3:
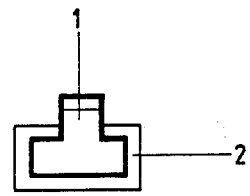
FIG. 3 shows a cross section through the spring clip and the rail having a C-shaped cross section.

The symmetrical spring clip 1 is made from a spring plate, bent in the shape of a wave and adjusted to the inside dimensions of the rail 2 having a C-shaped cross section. As is seen in FIG. 2, the spring clip 1 has the shape of two U-shaped parts 3 and 4 which are connected to each other and form the stop faces, and it has upwardly directed, tongue-like claws 5 through 8 on each side, which said claws sink into the material of the said rail 2 and bring about firm seating of the said spring clip 1 in the said rail 2. The two legs 15 and 16 of the said rail 2 having a U-shaped cross section have inwardly bent parts 17 and 18. The tongue-like claws 5 through 8 are formed by incisions made in the spring plate and by bending up. The claws 6 and 7 intended for the bent parts 17 and 18 are located in openings 19 and 20 of the said spring clip 1. The said spring clip 1 has two legs 22 and 23 at which the said claws 5 and 8 are disposed, and which reach out of the slot 24 between the two bent parts 17 and 18 of the said rail 1. When the two legs 22 and 23 are compressed by means of round-nosed pliers bent at right angles, the said claws 5 through 8 separate from the rail 2 having a C-shaped cross section, and the stop formed by the said spring clip 1 can be removed from or displaced in the said rail 2 until the said spring clip 1 springs back and is fixed in its new position upon releasing the legs 22 and 23.

The said claws 5 and 8 are also sufficient for anchoring the said stop, but the plate must be thicker in this case.

Figure 1:
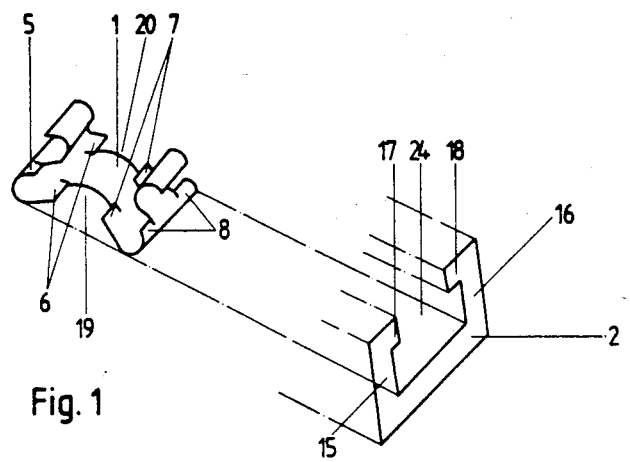
FIG. 1 shows a perspective view of the spring clip and the rail having a C-shaped cross section receiving the clip.
Figure 4:
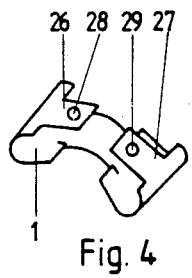
FIG. 4 shows another embodiment of the spring clip.

The design of the spring clip 1 as shown in FIG. 4 differs from that shown in FIG. 1 by the different shape of the legs. While the legs 22 and 23 are curved to enable their being compressed by means of round-nosed pliers bent at right angles, the legs 26 and 27 are flat and have holes 28 and 29 in them for inserting bent round-nosed pliers.

Although the illustrated embodiment(s) thereof (hereof have) has been described in great detail, it should be apparent that certain modifications, changes and adaptations may be made in the illustrated embodiment(s), and that it is intended to cover all such modifications, changes and adaptations which come within the spirit of the present invention.

The embodiments of the invention in which an exclusive property or privilege is claimed are defined as follows:

1. A stop, especially for the sliding piece that is displaceable in a guide rail having a C-shaped cross section and is connected to the window pane of a motor vehicle, characterized in that the said stop is designed as a spring clip, which can be pushed into the said rail having the C-shaped cross section, can be displaced and fixed in the said rail and absorbs a high impact force said spring clip is bent in a wave-shaped pattern and is symmetrical, said spring clip has claws for fixing the said spring clip inside said rail having the C-shaped cross section, said spring clip has two legs which reach out of the said rail having the C-shaped cross section, and the claws are released upon compression of said legs to permit displacement of the said spring clip in the longitudinal direction of the said rail having the C-shaped cross section.

2. A stop in accordance with claim 1, characterized in that the claws are tongue-like and are formed by incisions made in the spring plate and by bending the plate over.

3. A stop in accordance with claim 2, characterized in that the said claws are disposed in openings of the said spring clip and at their two legs.

4. A stop in accordance with claim 3, characterized in that the said spring clip is inserted into and released in the said rail having the C-shaped cross section by means of round-nosed pliers bent at right angles, with which the said legs, which reach out of the said rail having the C-shaped cross section, are compressed.

5. A stop in accordance with claim 4, characterized in that the said legs of the said spring clip are flat and are provided with holes for bent round-nosed pliers.

* * * * *